United States Patent
Reisch et al.

(10) Patent No.: US 8,499,914 B2
(45) Date of Patent: Aug. 6, 2013

(54) ARRANGEMENT FOR SHIFTING AT LEAST TWO FREEWHEELS

(75) Inventors: Matthias Reisch, Ravensburg (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 346 days.

(21) Appl. No.: 12/921,739

(22) PCT Filed: Feb. 20, 2009

(86) PCT No.: PCT/EP2009/052008
§ 371 (c)(1),
(2), (4) Date: Oct. 25, 2010

(87) PCT Pub. No.: WO2009/112338
PCT Pub. Date: Sep. 17, 2009

(65) Prior Publication Data
US 2011/0031085 A1    Feb. 10, 2011

(30) Foreign Application Priority Data
Mar. 13, 2008 (DE) .......................... 10 2008 000 646

(51) Int. Cl.
*F16D 28/00* (2006.01)
*F16H 3/083* (2006.01)

(52) U.S. Cl.
USPC .......................... 192/48.8; 192/48.91; 192/94

(58) Field of Classification Search
USPC ....... 192/49.92, 69.91, 84.6, 94, 48.8; 74/340
See application file for complete search history.

(56) References Cited

U.S. PATENT DOCUMENTS

| 1,669,749 | A * | 5/1928 | Guild ............................ 192/69.7 |
| 4,223,773 | A * | 9/1980 | Croisant et al. ............ 192/48.91 |
| 6,544,083 | B1 * | 4/2003 | Sawyer et al. .................. 440/75 |
| 7,216,560 | B2 * | 5/2007 | Fuhrer .......................... 74/337.5 |
| 8,196,725 | B2 * | 6/2012 | Mohr et al. .................. 192/48.2 |
| 2008/0000312 | A1 * | 1/2008 | Lang et al. ....................... 74/340 |
| 2011/0048156 | A1 * | 3/2011 | Reisch ....................... 74/473.36 |

FOREIGN PATENT DOCUMENTS

| DE | 866 290 C | 2/1953 |
| DE | 10 2004 001961 B4 | 7/2006 |
| EP | 0 446 087 A1 | 9/1991 |
| FR | 2 831 627 A1 | 5/2003 |
| WO | 2006/046868 A1 | 5/2006 |

OTHER PUBLICATIONS

International Search Report issued in international application No. PCT/EP2009/052008, mailed Nov. 19, 2009 (3 pages).
International Written Opinion issued in international application No. PCT/EP2009/052008, mailed Nov. 19, 2009 (6 pages).
International Preliminary Report on Patentability issued in international application No. PCT/EP2009/052008, dated Oct. 5, 2010 (7 pages).

* cited by examiner

*Primary Examiner* — Rodney Bonck
*Assistant Examiner* — Lillian Nguyen
(74) *Attorney, Agent, or Firm* — Brinks Hofer Gilson & Lione

(57) ABSTRACT

An arrangement for coupling at least two freewheels independent of an associated shaft of a gear mechanism comprises at least one shifting device that comprises an actuation device and a shifting device. The shifting device can be axially displaced with the actuation device that is arranged at least partially in the shaft.

20 Claims, 2 Drawing Sheets

ARRANGEMENT FOR SHIFTING AT LEAST TWO FREEWHEELS

Figure 1:
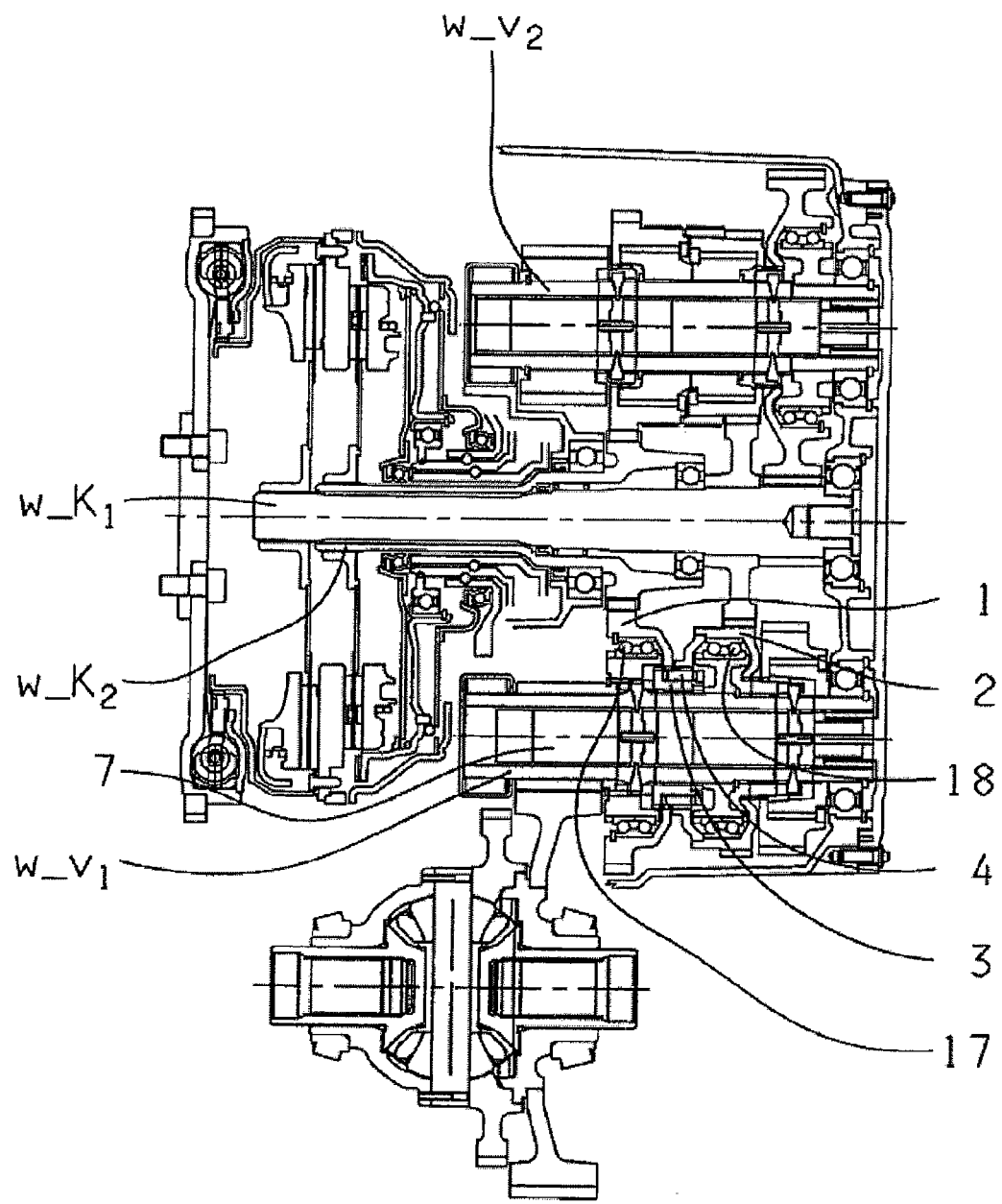

This application is a filing under 35 U.S.C. §371 of International Patent Application PCT/EP2009/052008, filed Feb. 20, 2009, which claims priority to German Application No. 10 2008 000 646.7, filed Mar. 13, 2008, each of which is incorporated by reference herein in its entirety.

The present invention concerns an arrangement for operating at least two idle wheels, independent of an associated shaft of a transmission, according to the type defined in the preamble of Claim 1.

The pamphlet DE 10 2004 001 961 B4 discloses, for example, a power shift transmission having a countershaft gear design. In the known power shift transmission, shiftable idle wheels are assembled at the respective counter shafts in order to be able to connect the counter shafts with the transmission input shafts. To operate a so-called winding path, in which the two transmission parts are coupled together, the known power shift transmission has a control element which allows two idle wheels of a counter shaft to be coupled for joint rotation without connecting the idle wheels with the counter shaft. The known control element is activated by means of an exterior control device, which is located on the outside in radial position of the idle wheels to be shifted. This increases considerably the radial installation space required for the known control element.

Therefore, the present invention is based on the objective to propose an arrangement of the type mentioned above, which is designed in a compact manner and requires the least installation space.

According to the invention, this objective is achieved through the characteristics of Claim 1. Further advantageous embodiments are shown in the sub-claims and drawings.

Accordingly, the invention proposes an arrangement for coupling at least two idle wheels, independent of an associated transmission shaft, having at least one shift device, which comprises an actuator and a control unit, in which the control unit including the actuator can be moved in axial direction. According to the invention, at least part of the actuator can be assembled in the shaft. In this way, an internally operated assembly is provided which allows for a switchable connection of two idle wheels. This means that the control unit of the invention-based arrangement of forming a direct connection between two adjacent idle wheels of a shaft is activated internally, i.e., from inside the shaft. As a result, a transmission equipped with the proposed arrangement can be produced in a compact and cost-efficient manner and with a large number of gears and can therefore be used preferably for front-transverse drive system of a vehicle.

The arrangement proposed by the invention can involve a friction-locked and/or form-fit control unit. Preferably, the form-fit control unit consists of a jaw clutch and synchronization is used for the friction locked control unit. It is also possible to use a combination of the control units mentioned above or a combination of any other control units.

Preferably, the actuator of the arrangement can be designed as an electrically powered spindle drive, or the like. However, it is also possible to use different drive systems, for example, pneumatic, mechanical, hydraulic drive systems. When using a spindle drive, it is advantageous to implement a pre-assembled modular construction in which the module can be easily inserted in the shaft designed, for example, as a hollow shaft. Depending on the intended use, the spindle drive can be connected with the shaft or with a housing part of the transmission.

In the context of a possible design variant of the invention, it can be arranged that the spindle drive comprises an electric motor, or the like, which powers the spindle coaxially to the shaft, which is coupled with a spindle nut to allow for axial movement. Thus, the spindle nut can produce an axial displacement of the control unit in order to connect the two idle wheels when engaged, independent of the shaft. It is also possible to form other operative connections between actuator and control unit.

Preferably, in the invention-based arrangement, the form-fit control unit can comprise, for example, a sliding sleeve that is coupled with the actuator. Said sliding sleeve is arranged on the shaft together with a shift dog, or the like, which is swivel-mounted on the shaft. It is located between the shiftable idle wheels and can be moved in axial direction. The shift dog is permanently connected with one of the idle wheels by means of a synchronized gear tooth system. It is also possible to use different form-fit shift dog connections in which the two control elements are arranged independently from one another. One control element is permanently connected with one of the idle wheels while the other control element is coupled with the actuator.

To provide the connection between the sliding sleeve and the actuator, it can be arranged that the sliding sleeve is coupled with the spindle nut of the drive by means of driving bolts, or the like, to allow for axial movement. Each driving bolt is guided through a radial hole of the shaft. Preferably, the bore hole can be designed as an elongated hole to allow the driving bolts to move in axial direction with the sliding sleeve.

For example, the spindle nut can be connected to the driving bolts by means of a radial groove provided on the outside of the spindle nut, and the driving bolts assembled at the sliding sleeve can engage in said spindle nut. Preferably, two opposite driving bolts can be assembled at the sliding sleeve. However, it is also possible to distribute additional driving bolts, for example, around the circumference of the sliding sleeve.

By means of the invention-based arrangement, a connection can be formed between the two idle wheels in that the sliding sleeve can be axially moved from a neutral position to a first switching position in such a way that the synchronized gear tooth system of the shift dog is coupled with the internal tooth system of the one idle wheel, as well as with the internal tooth system of the next idle wheel. Consequently, in this first switching position the two idle wheels are connected in a rotationally fixed manner and can be moved with a speed that is independent of the shaft. Moreover, in order to form a rotationally fixed connection between the idle wheel and the associated shaft, it is also possible to move in axial direction the sliding sleeve from neutral position to a further switching position in such a way that the external tooth system of the sliding sleeve is coupled with the internal tooth system of the idle wheel to be switched. In this way, the invention-based arrangement also allows one the idle wheels to be connected to the associated shaft.

Preferably, for independently receiving the shift dog, the external surface of the sliding sleeve can comprise a radial reception area, or the like, which supports rotationally, for example, the ring-shaped shift dog, independent of the sliding sleeve. To put the shift dog in an axially secure position, each side of the shift dog can be provided with an axial bearing, or the like.

Independent of the respective design variant, it can be arranged that for the support of the gear wheels, or idle wheels, to be shifted, preferably angular ball bearings, or the like, are used. Since under load the idle wheels have a relative rotation to the shaft, a bearing is required which can support an axial load and even a tilting moment under a relative speed. However, it is also possible to use different bearings which can fulfill the conditions mentioned above.

The proposed arrangement can be used for any transmission. However, preferably, the arrangement can be used in connection with a double clutch transmission in countershaft gear design to shift several load-shiftable gears and at least one winding path. In particular, it can be used to connect idle wheels with the respective counter shaft, or even idle wheels with each other, independent of the counter shaft, in order to provide a winding path, i.e., to couple with a control unit that can be activated internally the two transmission parts of the double clutch transmission. It is, for example, also possible to connect by means of the arrangement proposed by the present invention several idle wheels simultaneously with the associated counter shaft.

Subsequently, the invention is explained in more detail by means of the drawings. It is shown:

FIG. 1 A sectional view of a schematic diagram of an exemplary double clutch transmission with an invention-based arrangement;

And

Figure 2:
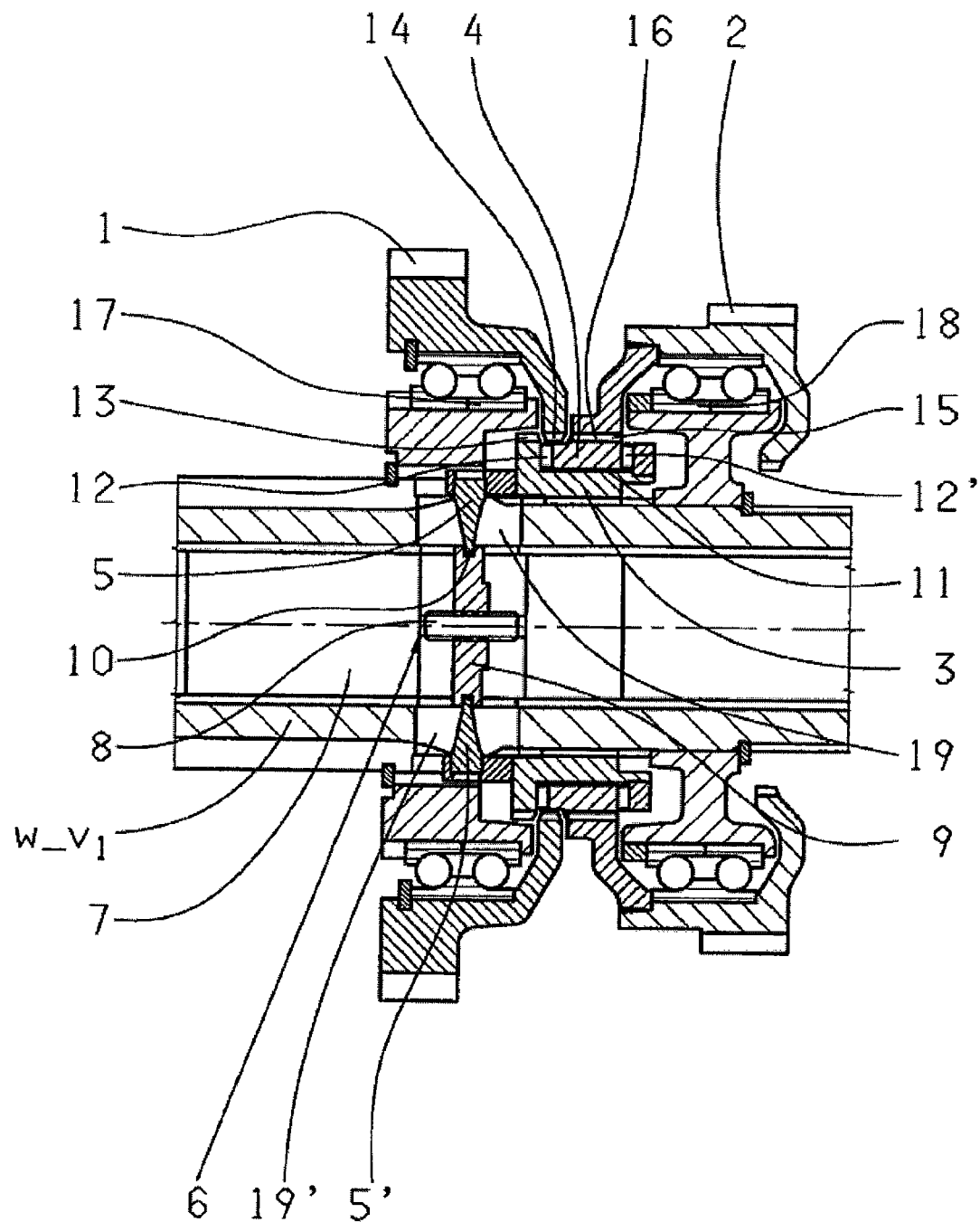

FIG. 2 A sectional view of a schematic diagram of a possible design variant of the invention-based arrangement.

FIG. 1 shows a sectional view of an exemplary multi-speed double clutch transmission to be used as a possible application area for an invention-based arrangement for shifting at least one idle wheel at an associated transmission shaft. The double clutch transmission comprises two clutches the input sides of which are connected with a drive shaft. In addition, a torsion vibration damper is connected to the drive shaft. The output sides of the clutches are connected with one of two transmission input shafts w_K1, w_K2, respectively, which are coaxially arranged to each other. The first transmission input shaft w_K1 has been designed as a solid shaft and the second transmission input shaft w_K2 as a hollow shaft. Furthermore, two counter shafts w_v1, w_v2 have been provided with have been arranged in axially parallel manner to one another. Each counter shaft w_v1, w_v2 is provided with several idle wheels, which engage to fixed wheels on the transmission input shafts w_K1, K_v2.

To be able to operate the idle wheels of the respective transmission input shaft w_v1, w_v2, at least one invention-based arrangement for operating the two idle wheels 1, 2 has been provided, independent of the respective transmission input shaft w_v1, w_v2. Consequently, by means of the invention-based arrangement, the two transmission input shafts w_K1 and w_K2 can be coupled through an internally activated control unit that so that the transmission input shafts w_K1 and w_K2 are interconnected and the double clutch transmission is provided with at least one winding path.

The invention-based arrangement for operating two idle wheels 1, 2 independent from the associated counter shaft w_v1 of the transmission comprises a shift device which has an internal actuator and a control unit, whereas the control unit can be axially moved with the actuator. The invention-based arrangement can also be provided at the other counter shaft w_2 for operating additional idle wheels. The arrangement shown in FIG. 1 is therefore only used as an example.

According to the invention, the internally activated shift device of the invention-based arrangement is able to couple with one another two idle wheels 1, 2 associated with the mutual counter shaft w_v1 in order to provide a winding path.

According to FIG. 2, the control unit comprises a sliding sleeve 3 which is coupled with the actuator and a shift dog 4. The sliding sleeve 3 is located on the counter shaft w_v1 and can be moved in axial direction. It can also be moved in axial direction by the actuator. For this purpose, radially extending driving bolts 5, 5' are mounted at the sliding sleeve 3. These driving bolts 5, 5' engage with the actuator. The embodiment according to FIG. 2 provides two driving bolts 5, 5' which are located opposite from each other. However, it is also possible to distribute additional driving bolts around the circumference of the sliding sleeve.

In the design variant shown, the actuator is activated internally and has an electrically operated spindle drive 6 which extends radially to the inside. The spindle drive 6 is a module located in the counter shaft w_v1 that is designed as a hollow shaft and is connected to the counter shaft in a rotationally fixed manner. The spindle drive 6 comprises an electric motor 7 which powers a spindle 8 that is coupled for axial movement with a spindle nut 9. On the outside, the spindle nut 9 has a radial groove 10 and the driving bolts 5, 5' attached to the sliding sleeve 3 are engaging with this groove. Through respective elongated holes 19, 19' of the counter shaft w_v1, each driving bolt 5, 5' is directed radially to the inside. By means of respective circular movements of the spindle 8, the sliding sleeve 3 can be axially moved in both directions.

On the outside surface of the sliding sleeve 3, a radial reception area 11 has been provided for receiving in rotatable manner the approximately ring-shaped shift dog 4. As a result, the shift dog 4 can be rotated, independent of the sliding sleeve 3. Since the actuator with the coupled sliding sleeve 3 rotates together with the associated counter shaft w_v1, the shift dog, which can rotate independently from the counter shaft, is secured in axial direction by means of axial bearings 12, 12'.

On its exterior, the shift dog 4 has a radial synchronized gear tooth system 15 which permanently engages to an internal tooth system 16 of the second idle wheel 3. If the sliding sleeve 3 is moved by the actuator from the neutral position of the arrangement shown in FIG. 2 to the left (in reference to the drawing plane), the synchronized gear tooth system 15 of the shift dog 4 can engage with the internal tooth system 14 of the first idle wheel 1, as well as with the internal tooth system 16 of the second idle wheel 2. In this first switching position, both idle wheels 1, 2 are coupled to one another, independent of the counter shaft w_v1, in order to provide a winding path at the transmission.

The sliding sleeve 3 comprises an external tooth system 13 which can be coupled with a corresponding internal tooth system 14 of the first idle wheel 1. For this purpose, the sliding sleeve 3 has to be moved by the actuator from the neutral position of the arrangement shown in FIG. 2 (in reference to the drawing plane) to the right. In this second switching position, the external tooth system 13 of the sliding sleeve 3 engages with the internal tooth system 14 of the first idle wheel 1. In this way, the first idle wheel 1 is operated by being connected with the counter shaft w_v1 in a rotationally fixed manner.

Independent of the design variant, at least one of the idle wheels 1, 2 can be rotatably mounted with angular ball bearings 17, 18 on the counter shaft w_v1. Furthermore, an electrical, or a pneumatic, mechanical, hydraulic or similar drive system can be used as a drive mechanism for the control unit.

REFERENCE NUMERALS 1 first idle wheel
2 second idle wheel
3, 3', 3" sliding sleeve
4, 4' shift dog
5, 5' driving bolt
6 spindle drive 7 electric motor
8 spindle
9 spindle nut
10 radial groove
11 reception area
12, 12' axial bearing
13 external tooth system of the sliding sleeve
14 internal tooth system of the first idle wheel
15 synchronized gear tooth system of the shift dog
16 internal tooth system of the second idle wheel
17 angular ball bearing
18 angular ball bearing
19, 19' elongated hole
w_K1 first transmission input shaft
w_K2 second transmission input shaft
w_v1 first counter shaft
w_v2 second counter shaft

The invention claimed is:

1. An arrangement for coupling at least two idle wheels independent of an associated shaft of a transmission, comprising a shift device, the shift device comprises
   an actuator, operable to move a control unit along an axial direction of a hollow shaft, being at least partially located in the hollow shaft; and
   the control unit, comprising
      a sliding sleeve on the shaft, being coupled with the actuator, located between two shiftable idle wheels and being movable along the axial direction of the hollow shaft,
      a shift dog, swivel-mounted on the hollow shaft, being together with the sliding sleeve and permanently coupled with one of the idle wheels by a synchronized gear tooth system.

2. The arrangement according to claim 1, wherein the control unit is one of a friction-locked control unit and form-fit control unit.

3. The arrangement according to claim 1, wherein the actuator is an electrically powered spindle drive.

4. The arrangement according to claim 1, wherein the actuator is located in the hollow shaft.

5. The arrangement according to claim 1, wherein the actuator is connected with the hollow shaft or with a housing part of the transmission.

6. The arrangement according to claim 1, wherein the actuator comprises
   an electric motor which powers a spindle coaxially to the shaft,
   the spindle, which is coupled with a spindle nut to allow for axial movement of the hollow shaft.

7. The arrangement according to claim 6, wherein the sliding sleeve is coupled with the spindle by driving bolts to allow the sliding sleeve for axial movement, wherein each driving bolt is guided through a radially extending elongated hole of the hollow shaft.

8. The arrangement according to claim 7, wherein an outside surface of the spindle nut comprises a groove, and driving bolts attached to the sliding sleeve engage with said groove.

9. The arrangement according to claim 6, wherein, in order to connect the two idle wheels with one another, the sliding sleeve is axially movable from a neutral position to a first switching position in such a way that a synchronized gear tooth system of the shift dog is coupled with an internal tooth system of a first idle wheel of the two idle wheels, as well as with an internal tooth system of a second idle wheel of the two idle wheels.

10. The arrangement according to claim 6, wherein, in order to form a rotationally fixed connection between a first idle wheel of the two idle wheels and the hollow shaft, the sliding sleeve is axially movable from a neutral position to a second switching position in such a way that an external tooth system of the sliding sleeve is coupled with an internal tooth system of the first idle wheel to be switched.

11. The arrangement according to claim 6, wherein an external surface of the sliding sleeve comprises a radial reception area for receiving in rotatable manner the shift dog, wherein the shift dog is in an approximately ring shape.

12. The arrangement according to claim 6, wherein the shift dog is secured in axial direction by axial bearings.

13. The arrangement according to claim 1, wherein the at least two idle wheels are rotatably mounted on the hollow shaft with angular ball bearings.

14. The arrangement according to claim 1, wherein the arrangement is used in a double clutch transmission for operating at least one winding path.

15. A shift device for coupling idle wheels, comprising:
   a shaft;
   a first idle wheel rotatably mounted on the shaft, comprising a first internal tooth system;
   a second idle wheel rotatably mounted on the shaft, comprising a second internal tooth system;
   a sliding unit, sleeved on the shaft and located between the first idle wheel and the second idle wheel, comprising a synchronized gear tooth system and being configured to be slidable between a neutral position and a first switching position, wherein the synchronized gear tooth system couples with the first internal tooth system and the second internal tooth system in the first switching position.

16. The shift device according to claim 15, wherein the sliding unit comprises a sliding sleeve and a shift dog swivel-mounted on the shaft, the shift dog comprises the synchronized gear tooth system and is permanently coupled with the first idle wheel by the synchronized gear tooth system.

17. The shift device according to claim 15, wherein the shaft is a hollow shaft, and the shift device further comprises:
   a spindle driven by an electric motor, being inside the hollow shaft and coaxially to the hollow shaft;
   a spindle nut coupled with the spindle, being movable along an axial direction of the hollow shaft; and
   the electric motor at least partially inside the hollow shaft, being operable to drive the spindle along the axial direction of the hollow shaft.

18. The shift device according to claim 17, wherein a sliding sleeve is coupled with a spindle by driving bolts to allow the sliding sleeve for axial movement, wherein each driving bolt is guided through a radially extending elongated hole of the hollow shaft.

19. The arrangement according to claim 18, wherein an outside surface of the spindle nut comprises a groove, and driving bolts attached to the sliding sleeve engage with said groove.

20. The shift device according to claim 15, wherein the sliding unit is further configured to be slidable to a second switching position, where an external tooth system of a sliding sleeve couples with the first internal tooth system only.

* * * * *

UNITED STATES PATENT AND TRADEMARK OFFICE
CERTIFICATE OF CORRECTION

PATENT NO.      : 8,499,914 B2                                          Page 1 of 1
APPLICATION NO. : 12/921739
DATED           : August 6, 2013
INVENTOR(S)     : Reisch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 388 days.

Signed and Sealed this

Fifteenth Day of September, 2015

Michelle K. Lee
*Director of the United States Patent and Trademark Office*